US006972685B2

(12) United States Patent
Sato et al.

(10) Patent No.: US 6,972,685 B2
(45) Date of Patent: Dec. 6, 2005

(54) LIQUID LEVEL SENSOR

(75) Inventors: Tetsuya Sato, Niigata (JP); Koichi Sato, Niigata (JP); Tadao Nakagawa, Niigata (JP); Kiyoshi Enomoto, Niigata (JP); Toshio Hayakawa, Niigata (JP); Yoshiyuki Shimazaki, Niigata (JP)

(73) Assignee: Nippon Seiki Co., Ltd., Niigata (JP)

( * ) Notice: Subject to any disclaimer, the term of this patent is extended or adjusted under 35 U.S.C. 154(b) by 299 days.

(21) Appl. No.: 10/469,683

(22) PCT Filed: Nov. 8, 2002

(86) PCT No.: PCT/JP02/11709

§ 371 (c)(1),
(2), (4) Date: Sep. 3, 2003

(87) PCT Pub. No.: WO03/042640

PCT Pub. Date: May 22, 2003

(65) Prior Publication Data

US 2004/0075564 A1 Apr. 22, 2004

(30) Foreign Application Priority Data

Nov. 12, 2001 (JP) ............................ 2001-345676
Mar. 28, 2002 (JP) .............................. 2002-91067

(51) Int. Cl.[7] ............................................... G08B 21/00
(52) U.S. Cl. ...................... 340/620; 340/623; 340/624; 73/304 R; 73/305; 73/317
(58) Field of Search ............................... 340/620, 623, 340/624; 73/304 R, 290 R, 305, 317, 323, 73/322.5

(56) References Cited

U.S. PATENT DOCUMENTS 6,571,627 B2 * 6/2003 Yasuda et al. ................ 73/317

FOREIGN PATENT DOCUMENTS

| | | | |
|---|---|---|---|
| JP | 54-157663 | A | 12/1979 |
| JP | 59-93102 | U | 6/1984 |
| JP | 63-1001 | A | 1/1988 |
| JP | 4-1682 | Y | 1/1992 |
| JP | 6-40821 | U | 5/1994 |

* cited by examiner

*Primary Examiner*—Jeffery Hofsass
*Assistant Examiner*—Daniel Previl
(74) *Attorney, Agent, or Firm*—McDermott Will & Emery LLP

(57) ABSTRACT

A liquid level detecting apparatus resistant to the deterioration and corrosion thereof is provided while holding down an increase in the manufacturing cost thereof. This apparatus 1 has fixed electrodes 3 on which a sliding contact point 5 is slidingly moved in accordance with a fluctuation of a float, and a first resistor 4 connected to the fixed electrodes 3, the fixed electrodes 3 being made of at least silver (Ag), palladium (Pd) and a glass component, a weight ratio of the silver (Ag) to palladium (Pd) being not lower than 75 wt. % to not higher than 25 wt. %, a sliding portion 7 of the fixed electrodes 3 on which the sliding contact point 5 is slidingly moved being covered with second resistors 8 a resistance value of which is lower than that of the first resistor 4.

8 Claims, 2 Drawing Sheets

LIQUID LEVEL SENSOR

TECHNICAL FIELD

This invention relates to a liquid level detecting apparatus, and more particularly to a liquid level detecting apparatus provided with fixed electrodes on which a sliding contact point is slidingly moved in accordance with a fluctuation of a float.

BACKGROUND ART

The related art liquid level detecting apparatuses include, for example, the apparatus disclosed in JP 59-93102 U.

In such a liquid level detecting apparatus, the materials for the fixed electrodes generally include a mixture of silver-palladium powder (AgPd) and glass. It is known that the fixed electrodes are obtained by printing on an insulating circuit board paste of a mixture of silver (Ag) powder, palladium (Pd) powder, glass powder and a solvent, drying the printed paste, and thereafter calcining the resultant product. The silver (Ag) has a low electric resistance, and is excellent in the conductivity but the us of the silver in the fuel causes the silver to be deteriorated by or corroded with, for example, sulfur, water and alcohol contained in the fuel. This causes an imperfect conduction of the silver (Ag). Therefore, the deterioration and corrosion preventing measures have been taken by adding an anti-deterioration and anti-corrosion substance including palladium (Pd) to the silver (Ag).

However, since the fixed electrodes use palladium (Pd), a noble metal, the material cost increases, and a liquid level detecting apparatus becomes expensive. Under the circumstances, one of the objects of the present invention is to provide a liquid level detecting apparatus resistant to the deterioration and corrosion of the fixed electrodes while holding down a cost increase.

DISCLOSURE OF INVENTION

To achieve this object, the present invention provides a liquid level detecting apparatus having fixed electrodes on which a sliding contact point is slidingly moved in accordance with a fluctuation of a float, and a first resistor connected to the fixed electrodes, the fixed electrodes being made of at least silver (Ag), palladium (Pd) and a glass component, a weight ratio of the silver (Ag) to palladium (Pd) being set not lower than 75 wt. % and not higher than 25 wt. %, sliding portions of the fixed electrodes on which the sliding contact point is slidingly moved being covered with second resistors the resistance value per unit area of which is lower than that of the first resistors. The structure thus formed enables a liquid level detecting apparatus resistant to the deterioration and corrosion of the fixed electrodes to be provided while holding down a cost increase.

The second resistors contain at least ruthenium oxide ($RuO_2$), and have a sheet resistivity of not higher than 1.5 $\Omega/mm^2$. Owing to this structure, a liquid level detecting apparatus resistant to the deterioration and corrosion of the fixed electrodes can be provided while holding down a cost increase.

The thickness of a film of each of the fixed electrodes is not larger than 12 $\mu$m. Owing to this structure, a liquid level detecting apparatus resistant to the deterioration and corrosion of the fixed electrodes can be provided while holding down a cost increase. Moreover, the quantity of the material in use for forming the fixed electrodes 3 can be reduced, and, in addition, the quantity of the expensive palladium (Pd) in use can also be reduced. This enables a liquid level detecting apparatus capable of further reducing the cost to be provided.

Each of the fixed electrodes has a weight ratio of a combination of the silver (Ag) and palladium (Pd) to the glass component set so that the weight percentage of the glass component is not higher than 15 wt. %. Owing to this structure, a liquid level detecting apparatus having a high resistance to the deterioration and corrosion of the fixed electrode can be provided while holding down a cost increase. When the content of the glass component is held down to a low level, excellent soldering characteristics of the fixed electrodes can be obtained.

The present invention relates to a liquid level detecting apparatus having fixed electrodes on which a sliding contact is slidingly moved in accordance with a fluctuation of a float, and a first resistor connected to the fixed electrodes, each of the fixed electrodes being made of at least silver (Ag), palladium (Pd) and a glass component, a weight ratio of the silver (Ag) to palladium (Pd) being set not lower than 80 wt. % and not higher than 20 wt. %, a sliding portion of the fixed electrode on which the sliding contact point is slidingly moved being covered with second resistors the resistance value per unit area of which is lower than that per unit area of the first resistor. Owing to this structure, a liquid level detecting apparatus resistant to the deterioration and corrosion of the fixed electrodes can be provided while holding down a cost increase.

The second resistors contain at least ruthenium oxide ($RuO_2$), and have a sheet resistivity of not higher than 1.0 $\Omega/mm^2$. Owing to this structure, a liquid level detecting apparatus having a resistance to the deterioration and corrosion of the fixed electrodes can be provided while holding down a cost increase.

The thickness of a thin film of each of the fixed electrode is not larger than 12 $\mu$m, or not smaller than 7.5 $\mu$m. Owing to this structure, a liquid level detecting apparatus resistant to the deterioration and corrosion of the fixed electrodes can be provided while holding down a cost increase. Since it is possible to reduce the quantity of the material in use for forming the fixed electrodes and that of the expensive palladium (Pd), a liquid level detecting apparatus capable of further reducing the cost can be provided.

Each of the fixed electrodes has a weight ratio of a combination of the silver (Ag) and palladium (Pd) to the glass component set so that the weight percentage of the glass component is not higher than 15 wt. %, or each of the fixed electrodes has a weight ratio of a combination of the silver (Ag) and palladium (Pd) to the glass component set so that the weight percentage of the glass component is not lower than 10 wt. %. Owing to this structure, a liquid level detecting apparatus resistant to the deterioration and corrosion of the fixed electrodes can be provided while holding down a cost increase. Moreover, since the content of the glass component is held down to a low level, it becomes possible to obtain excellent soldering characteristics of the fixed electrodes.

BEST MODE FOR CARRYING OUT THE INVENTION

Figure 1:
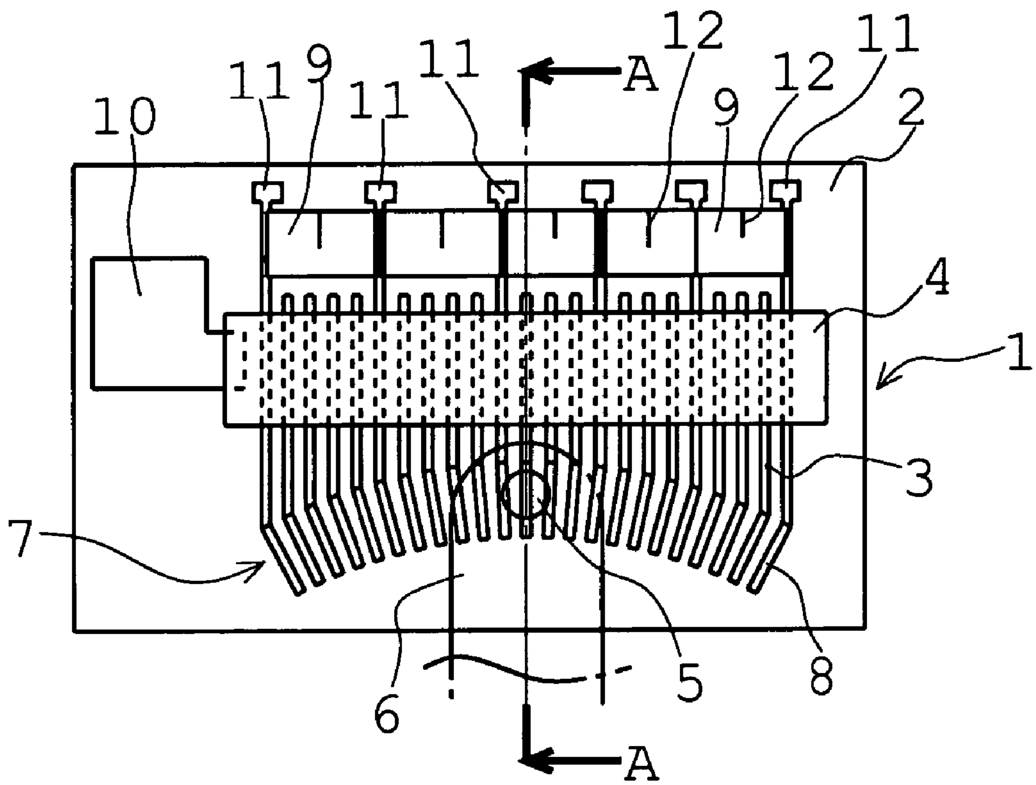
FIG. 1 is a front view of a first mode of embodiment of the present invention.
Figure 2:
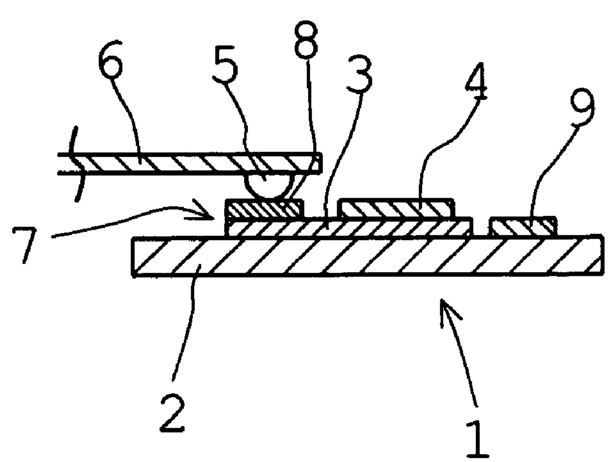
FIG. 2 is a sectional view taken along the line A—A in FIG. 1.

A first mode of embodiment of the present invention will be described with reference to FIGS. 1 and 2. This mode of embodiment will be described on the basis of a case where the present invention is applied to a liquid level detecting apparatus for a vehicle, such as an automobile.

This liquid level detecting apparatus 1 include an insulating circuit board 2 of a ceramic material, a plurality of fixed electrodes 3 provided on this circuit board 2, a first resistor 4 provided astride the plural fixed electrodes 3, a sliding member 6 provided with a sliding contact point 5 slidingly moved on the fixed electrodes 3, second resistors 8 provided on a sliding portion 7 of the fixed electrodes on which the sliding contact point 5 is slidingly moved, and regulating resistors 9 adapted to regulate a resistance value of the first resistor 4.

Each of the fixed electrodes 3 is made of at least silver (Ag), palladium (Pd) and a glass component. The glass component is made of boro-silicate lead glass and bismuth oxide. The fixed electrodes 3 are formed by turning a mixture of the materials thereof including the above-mentioned silver (Ag), palladium (Pd) and a glass component into a paste with a solvent. This paste type electrode material is formed on the circuit board 2 by means of screen printing techniques, and fixed electrodes 3 are thereafter formed via drying and calcining steps.

The fixed electrodes 3 are provided with the sliding portion 7, a solder-connected portion 10 and measuring lands 11. The fixed electrodes 3 constituting the sliding portion 7 are formed plurally. The solder-connected portion 10 is formed solely. This solder-connected portion 10 is formed to a substantially square shape in this mode of embodiment. A conductive member, such as a lead wire (not shown) is connected to the solder-connected portion 10 by soldering (not shown). The liquid level detecting apparatus 1 outputs a detection signal to a meter (not shown) through the conductive member.

The measuring lands 11 are members which a detecting needle (not shown) of a measuring unit contacts, the measuring unit being adapted to measure the resistance values of the portions of the first resistor 4 which are between the measuring lands 11. When a resistance value of the first resistor 4 is not a predetermined resistance value, the regulating resistors 9 are trimmed by a laser trimming method and the like so as to provide removal portions 12, and the resistance value of the first resistor 4 is thereby regulated.

The first resistor 4 is made of a material containing at least ruthenium oxide ($RuO_2$). The second resistors 8 and regulating resistors 9 are also made of the same material as the first resistor 4. However, the resistance values of these resistors 4, 8, 9 are set so that the resistance values are different from each other. Especially, the resistance value of the second resistors 8 is set so that the resistance value is lower than that of the first resistor 4.

The first resistor 4 is calcined on the plural fixed resistors 3, which constitute the sliding portion 7, in such a manner that the first resistor 4 strides over the fixed electrodes 3. The first resistor 4 is also connected to the solder-connected portion 10. The first resistor 4 is formed by means of screen printing techniques and the like in the same manner as the fixed electrodes 3, and then subjecting the resultant product to the drying and calcining steps is formed. The second resistors 8 and regulating resistors 9 are also formed through the same steps as the first resistor 4.

The sliding contact point 5 is fixed to the sliding member 6 by calking. Suitable materials for the sliding contact point 5 include a copper (Cu)-nickel (Ni)-zinc (Zn) alloy (German silver or nickel silver) and a nickel (Ni)-chromium (Cr) alloy. The sliding member 6 is suitably made of a copper (Cu)-nickel (Ni)-Zinc (Zn) alloy because this alloy is easily subjected to a processing step, such as a calking step, resistant to sulfur, and, in addition, inexpensive.

The sliding contact point 5 is a member adapted to be slidingly moved on the sliding portion 7 of the fixed electrodes 3 in accordance with the fluctuation of a float (not shown) floating on a level of the fuel. On the sliding portion 7 of the fixed electrodes 3, second resistors 8 are formed. The second resistors 8 are formed so as to cover the sliding portion 7.

The second resistors 8 are made of a material containing at least ruthenium oxide ($RuO_2$). Therefore, the second resistors 8 have a high abrasion resistance, and can prevent the sliding portion 7 from being worn. The sliding portion 7 is covered with the second resistors 8 having a high abrasion resistance and a high sulfurization resistance. This can prevent at the portion of the second resistors 8 which is engaged with the sliding contact point 5 the silver (Ag) contained in the slilding portion 7 (fixed electrodes 3) from being sulfurized by the sulfur content of gasoline, the fuel for an automobile, and from thereby generating silver sulfide.

In this mode of embodiment, the sheet resistivity of the second resistors 8 is set not higher than 1.5 $\Omega/mm^2$, and preferably to 1.0 $\Omega/mm^2$. Since the second resistors 8 have such a sheet resistivity value, it is possible that the second resistors 8 as resistors containing ruthenium oxide ($RuO_2$) rarely give an electric influence with a low resistance upon a portion between the sliding contact point 5 and sliding portion 7 while obtaining an abrasion resistance and sulfurization resisting characteristics.

In the fixed electrodes 3 forming the sliding portion 7, solder-connected portion 10 and measuring lands 11 which are made of the same material and the same components, the weight ratio of a combination of the silver (Ag) and palladium (Pd) to glass component is 85:15, i.e. 17:3 in this mode of embodiment. Owing to this structure, the abrasion resistance of the sliding portion 7 is obtained at the second resistors 8. Since the fixed electrodes contain a large quantity of conductive materials, such as silver (Ag) and palladium (Pd) with the ratio of the glass component held down, the fixed electrodes have an excellent electric performance, and the connection of solder in the solder connected portion 10 can also serve to obtain satisfactory performance thereof. Since the content of the glass component of the fixed electrodes 3 is held down to a low level, the quantity of the glass component migrating from the fixed electrodes 3 to the second resistors 8 when the second resistors 8 are calcined can be held down to a low level, and it becomes possible to restrain the electric noise occurring when the sliding contact point 5 and second resistors 8 contact each other. The ratio of the conductive materials to the glass component is not limited to the above-mentioned level. When the quantity of the conductive materials is not lower than 85 wt. % with that of the glass component not higher than 15 wt. %, fixed electrodes having both a satisfactory electric performance and a satisfactory solder connecting operation can be obtained.

In this mode of embodiment, the weight ratio of silver (Ag) to palladium (Pd) in the fixed electrodes 3 is 75:25, i.e. 3:1. When the quantity of palladium (Pd) in use is thus reduced, the material cost can be reduced, and, in its return, the cost of manufacturing the liquid level detecting apparatus 1 can also be reduced. The ratio of the silver (Ag) to palladium (Pd) is not limited to the above-mentioned level. As long as the content of the silver is not lower than 75% with that of the palladium not higher than 25 wt. %, a satisfactory electric performance is obtained, and the manufacturing of the apparatus can be done at a satisfactory cost.

The thickness of the films of the fixed electrodes 3 is not larger than 12 μm. Owing to this structure, the quantity of the materials in use for forming the fixed electrodes 3 can be reduced, and, in its return, the quantity of palladium (Pd), a noble metal in use can be reduced. This enables the manufacturing cost to be further reduced.

Figure 3:
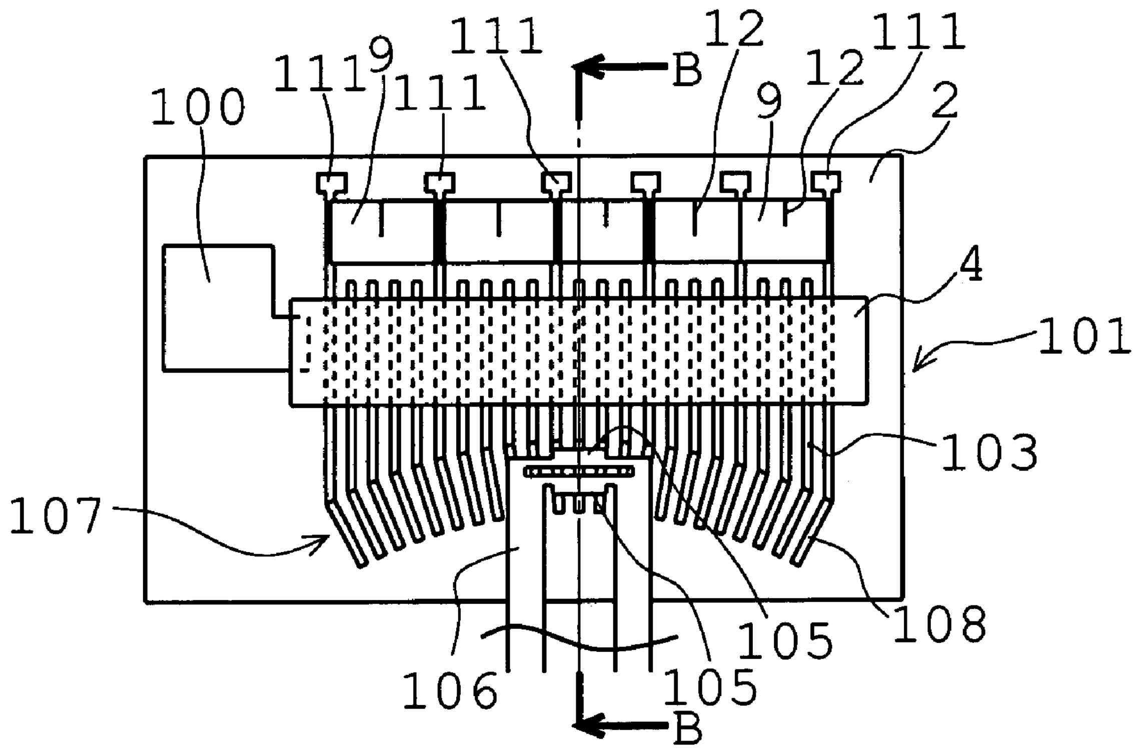
FIG. 3 is a front view of a second mode of embodiment of the present invention.
Figure 4:
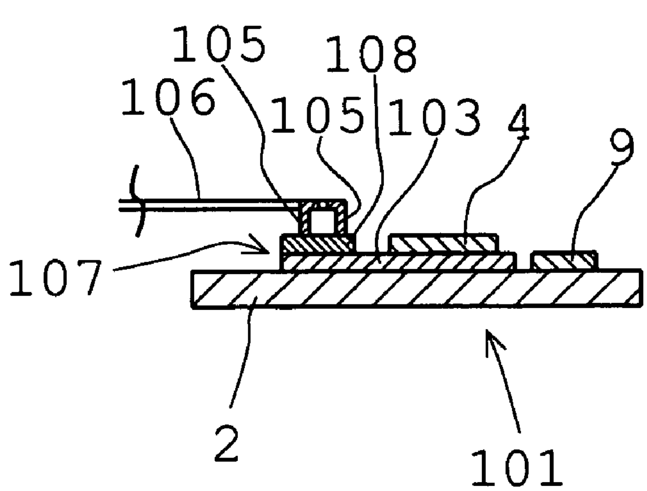
FIG. 4 is a sectional view taken along the line B—B in FIG. 2.

A second mode of embodiment of the present invention will now be described with reference to FIG. 3 and FIG. 4. The parts of this embodiment identical with and equivalent to those of the first mode of embodiment will be designated by the same reference numerals, and detailed descriptions thereof will be omitted.

The fixed electrodes 103 in the second mode of embodiment are also made of, at least, silver (Ag), palladium (Pd) and a glass component. The fixed electrodes 103 form a sliding portion 107, a solder connected portion 100 and measuring lands 111.

Second resistors 108 are made of at least a material containing ruthenium oxide ($RuO_2$). A first resistor 4 and regulating resistors 9 are also made of the same material as the second resistors 108. However, the resistance values of these resistors 4, 108, 9 are set so that the resistance values are different from each other, and, especially, the resistance value of the second resistors 108 is set so that the resistance value becomes lower than that of the first resistor 4. The second resistors 108 are formed so as to cover the sliding portion 107 of the fixed electrodes 103 therewith.

The sliding portion 107 is thus covered with the second resistors 108 with a high abrasion resistance and a high sulfurization resistance. This can prevent at the portion of the second resistors 108 which is engaged with the sliding contact points 105 described later the silver (Ag) contained in the sliding portion 107 (fixed electrodes 103) from being sulfurized by the sulfur content of gasoline, the fuel for an automobile, and from thereby generating silver sulfide.

The sliding contact points 105 are made integral with a sliding member 106. The sliding contact points 105 are formed by the pressing work. Suitable materials for the sliding contact points 105 and sliding member 106 include a copper (Cu)-nickel (Ni)-zinc (Zn) alloy (German silver or nickel silver). This material is suitable since the material is easily processed, resistant to the sulfurization thereof, and, in addition, inexpensive.

The sliding contact points 105 are bent so that the sliding contact points engage a circuit board 2 in the substantially perpendicular direction, and the bent sliding contact points 105 have a suitable length. Therefore, it becomes possible to, for example, increase a sliding frequency lost due to the wear on the sliding contact points, and this causes in its return the lifetime of the sliding contact points 105 to be prolonged.

Although the sliding contact points 105 in this mode of embodiment are made integral with the sliding member 106, the sliding contact points and sliding member may be formed separately as in the first mode of embodiment.

In the second embodiment, the sheet resistivity of the second resistor 108 is set not higher than 1.0 $\Omega/mm^2$. Owing to such a resistance value, it is possible that the second resistors as resistors containing ruthenium oxide ($RuO_2$) rarely give an electric influence with a low resistance upon a portion between the sliding contact point 105 and sliding portion 107 while obtaining an abrasion resistance and sulfurization resisting characteristics.

In the fixed electrodes 103 in this mode of embodiment, the weight ratio of a combination of silver (Ag) and palladium (Pd) to a glass component is set to 90:10, i.e. 9:1. Owing to this structure, the abrasion resistance of the sliding portion 107 is obtained at the second resistors 108. Since the fixed electrodes contain large quantities of conductive materials, such as silver (Ag) and palladium (Pd) with the ratio of the glass component held down, the fixed electrodes have an excellent electric performance, and the connection of solder in the solder-connected portion 110 can also serve to obtain a satisfactory performance thereof.

The content of the glass component in the fixed electrodes 103 is held down to a low level. Therefore, when the second resistors 108 are calcined, the glass component in the fixed electrodes 103 can hold down the quantity of the glass component which migrates therefrom to the side of the second resistors 108, and this enables electric noise occurring when the sliding contact point 105 and second resistor 108 contact each other to be held down.

The ratio of the content of the conductive materials to that of the glass component is not limited to the above-mentioned level. When the content of the glass component is in the range from not lower than 10 wt. % to not higher than 15 wt. % with that of the conductive materials in the range from not higher than 90 wt. % to not lower than 85 wt. %, a satisfactory electric performance is obtained, and the connection of solder can also be executed satisfactorily.

The weight ratio of the silver (Ag) to palladium (Pd) contained in the fixed electrodes 103 in this mode of embodiment is set to 80:20, i.e. 4:1. When the quantity of palladium (Pd) in use is thus reduced, the reduction of the cost can be effected, and, in its return, the cost of manufacturing the liquid level detecting apparatus can also be attained. The ratio of the silver (Ag) to palladium (Pd) is not limited to the above-mentioned level. As long as the content of the silver is not lower than 80 wt. % with that of the palladium not higher than 20 wt. %, a satisfactory electric performance is obtained, and the manufacturing of the apparatus can be done at a satisfactory cost.

The thickness of the films of the fixed electrodes 103 is not larger than 12 μm, and preferably not smaller than 7.5 μm. Owing to this structure, the quantity of the materials used to form the fixed electrodes 103 can be reduced, and, in its return, the quantity of the palladium (Pd), a noble metal in use can also be reduced. This enables the manufacturing cost to be further reduced.

INDUSTRIAL APPLICABILITY

The present invention can be utilized for a liquid level detecting apparatus resistant to the deterioration and corrosion thereof, with an increase in the manufacturing cost held down.

What is claimed is:

1. A liquid level detecting apparatus provided with fixed electrodes on which a sliding contact point is slidingly moved in accordance with a fluctuation of a float, and a first resistor connected to the fixed electrodes, characterized in that the fixed electrodes are made of at least silver (Ag), palladium (Pd) and a glass component, a weight ratio of the silver (Ag) to the palladium (Pd) being set not lower than 75 wt. % to not higher than 25 wt. %, a sliding portion of the fixed electrodes on which the sliding contact point is slidingly moved being covered with second resistors a resistance value per unit area of which is lower than that per unit area of the first resistor.

2. A liquid level detecting apparatus according to claim 1, wherein the second resistors contain at least ruthenium oxide ($RuO_2$), and have a sheet resistivity of not higher than 1.5 $\Omega/mm^2$.

3. A liquid level detecting apparatus provided with fixed electrodes on which a sliding contact point is slidingly moved in accordance with a fluctuation of a float, and a first resistor connected to the fixed electrodes, characterized in that the fixed electrodes are made of at least silver (Ag), palladium (Pd) and a glass component, a weight ratio of the silver (Ag) to the palladium (Pd) being set to not low r than 80 wt. % to not higher than 20 wt. %, a sliding portion of the fixed electrodes on which the sliding contact point is slidingly moved being covered with second resistors a resistance value per unit area of which is lower than that per unit area of the first resistor.

4. A liquid level detecting apparatus according to claim 1 or 3, wherein the second resistors contain at least ruthenium oxide ($RuO_2$), and have a sheet resistivity of not higher than 1.0 $\Omega/mm^2$.

5. A liquid level detecting apparatus according to claim 1 or 3, wherein the thickness of films of the fixed electrodes is not larger than 12 $\mu$m.

6. A liquid level detecting apparatus according to claim 3, wherein the thickness of the films of the fixed electrodes is not smaller than 7.5 $\mu$m.

7. A liquid level detecting apparatus according to claim 1 or 3, wherein, concerning a weight ratio of a combination of the silver (Ag) and palladium (Pd) to the glass component, the content of the glass component is not higher than 15 wt. %.

8. A liquid level detecting apparatus according to claim 3, wherein, concerning a weight ratio of a combination of the silver (Ag) and palladium (Pd) to the glass component, the content of the glass component is not lower than 10 wt. %.

* * * * *